March 14, 1967  G. H. AMSBURY  3,308,795
CUT-OFF DEVICE FOR AUTOMOBILE ENGINE
Filed June 6, 1966

INVENTOR
GENE H. AMSBURY

BY *Misegades & Douglas*
ATTORNEYS

United States Patent Office 3,308,795
Patented Mar. 14, 1967

3,308,795
CUT-OFF DEVICE FOR AUTOMOBILE ENGINE
Gene H. Amsbury, 503 S. Dawson St.,
Raleigh, N.C. 27601
Filed June 6, 1966, Ser. No. 555,488
5 Claims. (Cl. 123—41.15)

The present invention relates to an ignition cut-off safety device, and more particularly the invention relates to an automobile or motor vehicle cut-off device in which the electrical system of such vehicle is cut-off or de-energized upon the condition that the fan belt is broken or slips off the pulleys.

It has been found that when the fan belt of an automotive vehicle, such as a Volkswagen or the like, is broken, the engine is caused to overheat since the fan belt is broken or slipped off the pulleys, and the cooling stops to result in causing the engine to overheat.

In the present invention, the fan belt drives the fan to continue cooling of the heated engine, but in the event the fan belt breaks or slips off the pulleys, it is no longer used for driving the fan, the engine is no longer cooled, and there is provided a tension responsive mechanism that disengages or shorts the electrical circuit of the ignition or the distributor, so that the engine becomes cut off and the engine will cease to operate. Thus when the fan belt is broken, or slips off the pulleys, a tension spring arm mounting a pulley is forced to be displaced by the absence of the fan belt which displaces the pulley extending the safety mechanism a portion of an inch or more beyond where the fan belt was, and thus causing the ignition circuit to become grounded so that the motor is caused to stop operating instantly, and the motor is thus prevented from overheating.

An object, therefore, of the invention is to automatically shut down or cut off air-cooled engines in the event of a fan or blower failure due to the drive belt being broken or slipped off the pulleys, and such breakage or slipping off the pulleys, thereby controlling the engine to be halted so that engine damage due to overheating is prevented.

The above and other objects and advantages of the invention will become apparent upon full consideration of the following detailed description and accompanying drawings in which.

Figure 1:
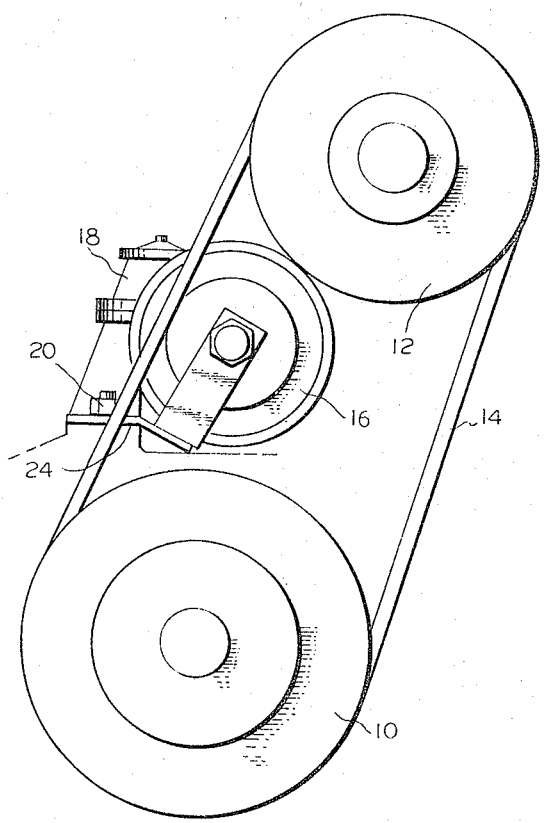
FIGURE 1 shows diagrammatically a front elevation view of an embodiment of the manner in which a safety device is adapted to be installed, in accordance with the invention.
Figure 2:
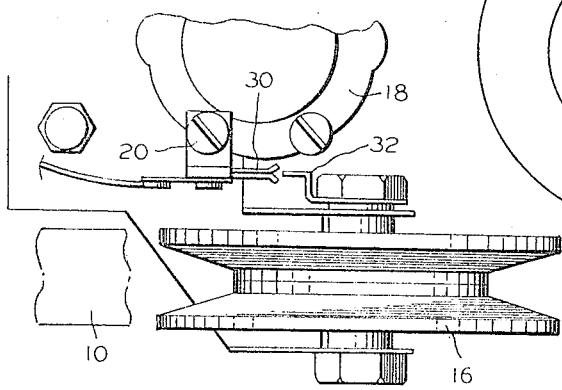
FIGURE 2 shows a top view of FIGURE 1.

Referring now to the drawings, there is shown the motor pulley 10 of a vehicle such as a Volkswagen, a generator and cooling fan pulley 12, a belt 14 that is threaded over the pulleys 12 and 10, and an idler pulley 16 that is mounted from the engine or is mounted from a support element of a fuel pump 18 by a fuel pump mounting stud, or other available studs, 20 by a spring or resilient mounting bracket 24 that is constructed of spring steel or other resilient types of steel, as are well known. It is seen that there is sufficient flexibility and resilience in the bracket 24 so that the belt 14 is threaded over the pulley 16 sufficiently so that the pulley 16 is displaced to the right a small distance, as would appear in FIG. 1, and if the belt 14 may break or become stretched in some manner, or slipped off the pulleys, so that the motor pulley 10 no longer drives the pulley 12, then the pulley 16 is displaced due to the resilient effect of the mounting bracket 24 so that it is displaced toward the left in FIG. 1. In this way, any displacement to the left is sufficient to cause electrical contacts 30, 32 to close. Contacts 30, 32 may be connected integral with the ignition system whether it is to the primary voltage side or the secondary voltage side of the coil, or to any connection between the coil (not shown) and the distributor (not shown), so that there is effected a grounding or short circuit of contact 30 to contact 32 which in turn is connected to ground through the bracket 24 and the fuel pump mounting stud, or other available studs, 20 of the engine.

Figure 4:
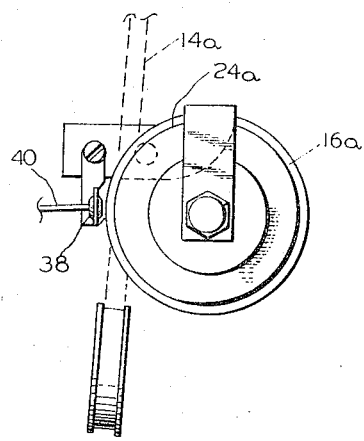
FIGURES 3 and 4 show another embodiment of the invention in which a safety mechanism or switch is operated to short out to ground the ignition coil and thus break the electrical circuit of an automotive vehicle.
Figure 3:
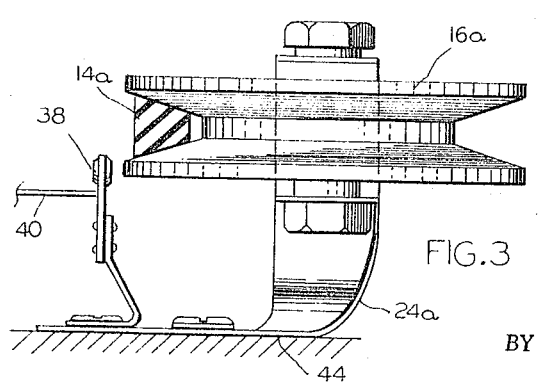

A further embodiment is shown adaptable to Corvairs in which the pulley 16a is adapted to be displaced to the left of FIGS. 3 and 4, as shown, so that the pulley 16a closes contact with contact element 38, so that the conductor 40 from the ignition system is grounded through the pulley 16a and thus to the engine block 44 by means of the resilient steel mounting bracket 24a. Also shown in FIGS. 3 and 4 is the Corvair V belt 14a which is normally displaced over the pulley.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. An ignition cut-off device comprising a resiliently mounted rotatable pulley supportably mounted from a portion of an automotive engine, said engine having an ignition system including at least a conductor, said conductor having a terminal contact spatially related to the rotatable pulley, and potentially engageable therewith upon displacement of the pulley from its stressed or tensioned position, said pulley being normally in engagement with a belt driven under tension by said engine and being held under displacement against the characteristic of said resilient mounting by said tension, said terminal contact forming a short circuit to ground through said pulley when the belt has lost its tension imposed upon said pulley due to breakage of the belt or slipping off the pulleys, in which case the pulley comes into contact with said terminal contact thereby forming said short circuit.

2. The invention according to claim 1 wherein said contact engages a peripheral part of said pulley.

3. The invention according to claim 1 wherein said terminal contact is spatially disposed with a cooperating contact mounted about the axis of said pulley and comes into contact forming said short circuit upon the pulley being released from said condition of tension.

4. The invention according to claim 1 wherein said resiliently mounted rotatable pulley is supportably mounted from an appropriate position on the engine by a resilient bracket.

5. The invention according to claim 4 wherein said belt is the fan belt of an air cooled engine.

UNITED STATES PATENTS

References Cited by the Examiner 2,211,971  8/1940  Flanders _____ 123—198
2,798,465  7/1957  Nicholson _____ 123—41.15

FOREIGN PATENTS 826,218  12/1951  Germany.
1,042,967  6/1958  Germany.
574,654  3/1958  Italy.

MARK NEWMAN, *Primary Examiner.*
AL LAWRENCE SMITH, *Examiner.*